H. T. MOORE.
HANDLE FOR KITCHEN UTENSILS.
APPLICATION FILED MAR. 13, 1909.
968,585.
Patented Aug. 30, 1910.
2 SHEETS—SHEET 2.
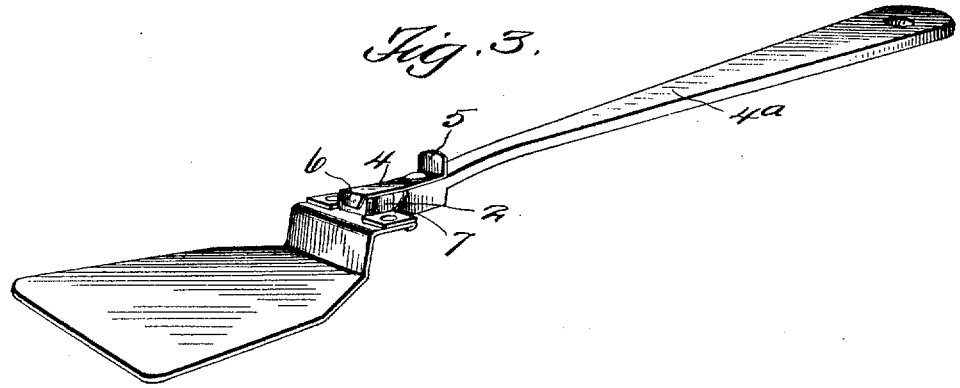
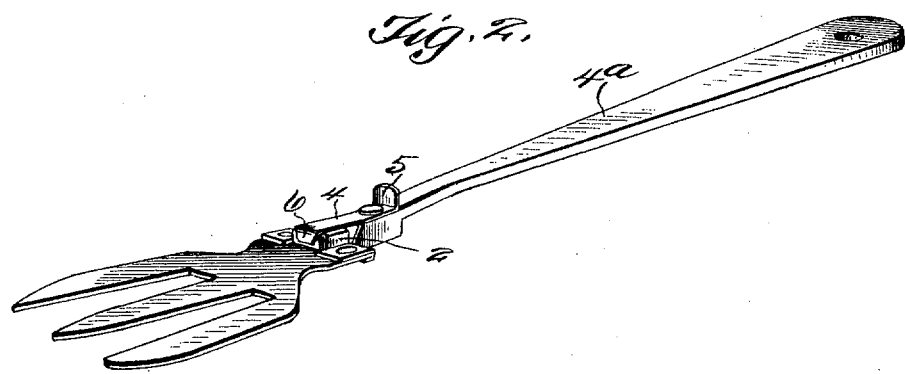
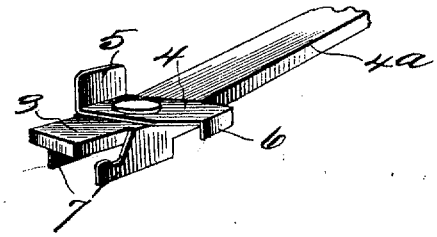
Witnesses
Inventor
H. T. Moore
By D. Swift & Co.
Attorneys

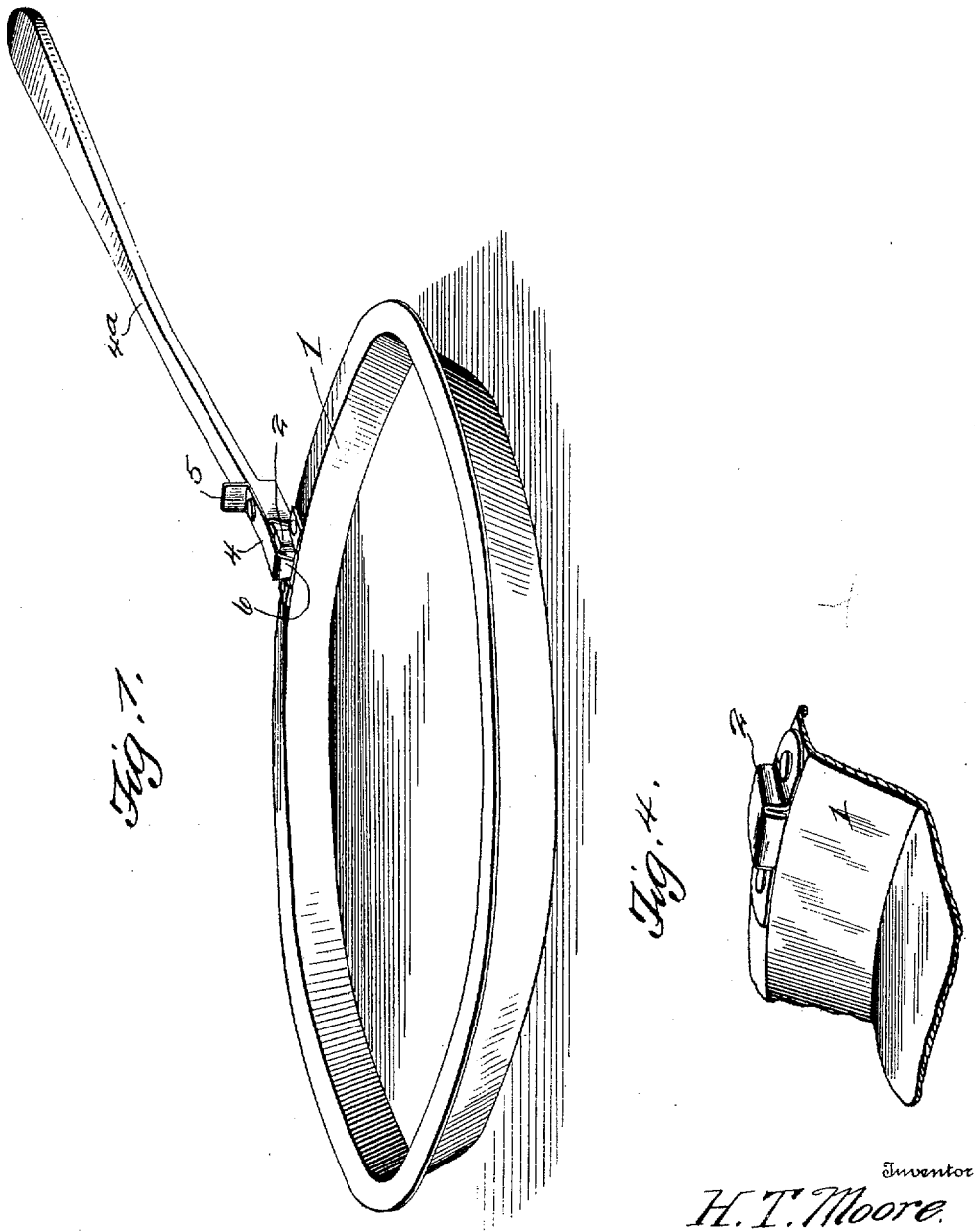

UNITED STATES PATENT OFFICE.

HARRY T. MOORE, OF OAKLAND, CALIFORNIA.

HANDLE FOR KITCHEN UTENSILS.

968,585.  Specification of Letters Patent.  Patented Aug. 30, 1910.

Application filed March 13, 1909. Serial No. 483,197.

*To all whom it may concern:*

Be it known that I, HARRY T. MOORE, a citizen of the United States, residing at Oakland, in the county of Alameda and State of California, have invented a new and useful Handle for Kitchen Utensils; and I do hereby declare the following to be a full, clear, and exact description of the invention, such as will enable others skilled in the art to which it appertains to make and use the same.

The invention relates to a combination handle for kitchen utensils, and has for its object to provide a device of this character which is adapted for use as a lifter for lifting pie plates from the stove while hot.

Another object of the invention is to provide a device of this character adapted to be used as a handle for a cake-turner, fork, spoon or the like.

With these and other objects in view, the invention consists in the novel construction and arrangement of parts hereinafter described and shown, and particularly pointed out in the appended claim.

In the drawings, Figure 1 is a perspective view, showing my invention applied to a pie plate. Fig. 2 is a perspective view showing my invention applied to a fork. Fig. 3 is a perspective view, showing my invention applied to a cake turner. Fig. 4 is an enlarged perspective view of the bracket 2, showing the same mounted on a pie plate. Fig. 5 is a perspective view of one end of the handle 4ª, and the locking member 4, shown detached from the utensil.

Referring to the drawings, 1 designates a pie-plate which is provided with a bracket 2 rigidly mounted upon the periphery thereof. The bracket 2 is adapted to be engaged by a head 3 of a handle 4ª. Pivotally mounted upon the head 3 is a locking device 4, provided with an upturned thumb piece 5 by which said locking member is turned upon its pivot.

When it is desired to use the device as a handle for a fork or the like, the locking piece 4 is turned at right angles to the head 3, after which the head is inserted in the bracket, the locking member is then turned to its normal position which engages the top of the bracket and the down turned portion 6 engages the side of the bracket by which said handle is firmly locked in engagement with said kitchen utensils. When it is desired to withdraw the handle, the locking piece is again turned at right angles with the head 3 by means of the thumb piece 5, which readily permits the withdrawal of the handle, as will be readily understood.

The lower side of the head 3 is provided with a pair of jaws 7 which engage the underside of the device to which the handle is attached and which coöperate with the head and holds the handle against oscillation while engaging the cooking utensil.

Having thus described the invention, what is claimed is:—

In combination, a utensil provided with a bracket comprising attaching side portions and an elevated central portion having a depending flange, a removable handle for said utensil, said handle being provided with forwardly extending spaced side members, and an end adapted to be placed within the central portion of said bracket, and a latch having an angular end adapted to engage the depending flange of the bracket pivoted to the handle.

In testimony whereof I have signed my name to this specification in the presence of two subscribing witnesses.

HARRY T. MOORE.

Witnesses:
C. W. BROWN,
LOU H. SIEBER.